US010920640B2

(12) United States Patent
Kurpejovic

(10) Patent No.: US 10,920,640 B2
(45) Date of Patent: Feb. 16, 2021

(54) MIXER

(71) Applicant: Eberspächer Exhaust Technology GmbH, Neunkirchen (DE)

(72) Inventor: Enver Kurpejovic, Kirchheim unter Teck (DE)

(73) Assignee: Eberspächer Exhaust Technology GmbH, Neunkirchen (DE)

( * ) Notice: Subject to any disclaimer, the term of this patent is extended or adjusted under 35 U.S.C. 154(b) by 0 days.

(21) Appl. No.: 16/750,293

(22) Filed: Jan. 23, 2020

(65) Prior Publication Data

US 2020/0240312 A1    Jul. 30, 2020

(30) Foreign Application Priority Data

Jan. 24, 2019    (DE) .......................... 10 2019 101 678

(51) Int. Cl.
| F01N 3/28 | (2006.01) |
| F01N 3/08 | (2006.01) |
| F01N 3/10 | (2006.01) |
| F01N 13/00 | (2010.01) |

(52) U.S. Cl.
CPC ......... *F01N 3/2803* (2013.01); *F01N 3/0871* (2013.01); *F01N 3/106* (2013.01); *F01N 13/002* (2013.01); *F01N 2610/146* (2013.01)

(58) Field of Classification Search
CPC ...... F01N 3/2083; F01N 3/0871; F01N 3/106; F01N 13/002; F01N 2610/146
USPC ................................................. 422/168, 176
See application file for complete search history.

(56) References Cited

U.S. PATENT DOCUMENTS

| 6,444,177 B1* | 9/2002 | Muller ............... B01D 53/8631 422/177 |
| 2011/0094206 A1* | 4/2011 | Liu ........................ F01N 3/2892 60/274 |
| 2013/0247545 A1 | 9/2013 | Solbrig et al. |
| 2015/0071825 A1 | 3/2015 | Sampath |
| 2016/0361694 A1 | 12/2016 | Brandl et al. |

FOREIGN PATENT DOCUMENTS

| CN | 106 523 091 A | 3/2017 |
| CN | 107 131 031 A | 9/2017 |
| CN | 107 165 707 A | 9/2017 |
| DE | 10 2013 205 297 A1 | 7/2014 |
| DE | 10 2014 105 836 A1 | 10/2014 |
| DE | 10 2015 005 689 B3 | 3/2016 |
| EP | 3 216 992 A1 | 9/2017 |
| EP | 3 346 104 A1 | 7/2018 |

* cited by examiner

*Primary Examiner* — Tom P Duong
(74) *Attorney, Agent, or Firm* — McGlew and Tuttle, P.C.

(57) ABSTRACT

A mixer for mixing exhaust gas flowing in an exhaust gas duct of an internal combustion engine with reactant injected into the exhaust gas duct includes a plate-shaped exhaust gas collection body (12) with an incoming flow surface (14) on an exhaust gas incoming flow side (16) and with a rear side (18) facing away from the incoming flow side (16). A duct housing (20), arranged on the rear side (18) of the exhaust gas collection body (12), has a reactant-receiving duct (28) and at least one release duct (48, 50) leading away from the reactant-receiving duct (28). An exhaust gas collection opening (34) is formed in the exhaust gas collection body (12). An exhaust gas collection duct (36) leads from the exhaust gas collection opening (34) to the duct housing (20) and is open to the reactant-receiving duct (28).

20 Claims, 5 Drawing Sheets

MIXER

CROSS REFERENCE TO RELATED APPLICATIONS

This application claims the benefit of priority under 35 U.S.C. § 119 of German Application 10 2019 101 678.9, filed on Jan. 24, 2019, the entire contents of which are incorporated herein by reference.

TECHNICAL FIELD

The present invention pertains to a mixer for mixing exhaust gas flowing in an exhaust gas duct of an internal combustion engine with reactant injected into the exhaust gas duct.

TECHNICAL BACKGROUND

Such a mixer is known from EP 3 216 992 A1. This mixer, built from two shaped sheet metal parts connected to one another, has a generally disk-like shape with a circular outer circumferential contour adapted to the inner circumferential contour of an exhaust gas pipe, which receives this mixer and delimits an exhaust gas duct. The two shaped sheet metal parts of the mixer define together a reactant receiving duct, into which reactant is injected through a reactant release device, as well as two exhaust gas ducts leading away from the reactant receiving duct in essentially mutually opposite directions. A plurality of openings, through which exhaust gas can flow into the reactant-receiving duct as well as into the release ducts in case the shaped sheet metal part is oriented in the upstream direction and a mixture of exhaust gas and reactant, for example, a urea/water solution, which mixture is generated in the mixer, can be discharged to the section of the exhaust gas duct, which section extends downstream of the mixer, and to an SCR catalytic converter device arranged therein, are provided in each of the two shaped sheet metal parts of the mixer.

SUMMARY

An object of the present invention is to provide a mixer, with which an efficient mixing of exhaust gas and reactant is achieved with a compact and simple configuration.

This object is accomplished according to the present invention by a mixer for mixing exhaust gas flowing in an exhaust gas duct of an internal combustion engine with reactant injected into the exhaust gas duct, comprising:
- a plate-like (plate-shaped) exhaust gas collection body with an incoming flow surface on an exhaust gas incoming flow side and with a rear side facing away from the incoming flow side, and
- a duct housing arranged on the rear side of the exhaust gas collection body with a reactant-receiving duct and with at least one release duct leading away from the reactant-receiving duct in the duct housing,
- wherein an exhaust gas collection opening is formed in the exhaust gas collection body, and wherein an exhaust gas collection duct leads from the exhaust gas collection opening to the duct housing and is open to the reactant-receiving duct.

The mixer according to the present invention can provide an efficient mixing of exhaust gas and reactant without a complex shape of the individual components especially due to the fact that a systematic splitting into an area comprising essentially the plate-shaped exhaust gas collection body, i.e., a collection body configured as a plate, and an area comprising essentially the duct housing are provided. Each of these two areas, which are preferably configured separately from one another, can be provided in itself with a comparatively simple shape and can be adapted to the task to be performed by this area.

Especially when the mixer according to the present invention is to be arranged in an exhaust gas duct with a round circumferential contour, it is especially advantageous for an efficient introduction of exhaust gas into the duct housing if the exhaust gas collection body has a round, preferably circular outer circumferential contour. Further, provisions may be made for the exhaust gas collection opening to be arranged offset to an edge of the plate of the exhaust gas collection body in relation to the center of the plate of the exhaust gas collection body, so that the duct housing provided on the rear side of the exhaust gas collection body can be arranged without problems in the area covered by the circumferential contour of the exhaust gas collection body and it does not project over this circumferential contour. Further, it is proposed for a configuration that can be embodied in a simple manner that the duct housing be arranged at a spaced location from the rear side of the exhaust gas collection body.

In order to achieve a low resistance to flow with a defined flow guiding when guiding the exhaust gas stream in the direction of the duct housing, it is proposed that a collection duct circumferential wall of the exhaust gas collection duct pass over in a rounded transition area into the plate-shaped exhaust gas collection body.

At least one part of the transition area, preferably the entire transition area, may be made for this purpose in one piece with the exhaust gas collection body for a configuration that can be embodied in a simple manner.

Especially when the collection duct circumferential wall is comparatively short and can be embodied from the material that was previously located in the area of the exhaust gas collection opening, for example, at the time of the shaping of a blank to obtain the exhaust gas collection body, it is further proposed for a simple configuration that at least one part of the transition area, preferably the entire rounded transition area, be formed in one piece with the collection duct circumferential wall. The exhaust gas collection body can thus be formed in one piece with the transition area and with at least one part of the collection duct circumferential wall, i.e., from a block of material, rather than composed from a plurality of parts. It is possible, as an alternative, to configure at least one part of the transition area as a component of the collection duct circumferential wall or only the collection duct circumferential wall as a, for example, essentially cylindrical component separately from the exhaust gas collection body and from the transition area and to connect it to this by connection in substance, for example, by welding.

A collection duct central axis of the exhaust gas collection duct may be essentially at right angles to the incoming flow surface.

It is proposed for an efficient mixing of exhaust gas and reactant and for a uniform release into an area of an exhaust gas duct accommodating the mixer, which area follows downstream, that the duct housing have a U-like (U-shape) or arc segment-like shape (arc segment shape) with a housing apex area providing essentially the reactant-receiving duct and two housing duct areas, which adjoin the housing apex area and provide a release duct each, and that the exhaust gas collection duct be open in the housing apex area to the reactant-receiving duct. The housing apex area may consequently correspond to a connection web of an essentially U-shape, while the releasing ducts may correspond to the two U-legs adjoining the connection web. It should be stressed that depending on the radius of curvature of the housing apex area, this may also correspond to an approximately V-shape, or that the curved shape in the housing apex area may continue into the release ducts or the U-legs with, for example, an essentially constant or decreasing radius of curvature.

To connect a reactant release device, generally also called injector, to the duct housing, it is proposed that a reactant release pipe open to the reactant-receiving duct in the area of a reactant-receiving opening of the duct housing in the apex area be arranged at the duct housing.

It is further proposed for efficiently merging the exhaust gas stream guided through the exhaust gas collection opening and the reactant injected into the reactant-receiving duct that a release pipe central axis of the reactant release pipe and a collection duct central axis of the exhaust gas collection duct be essentially at right angles to one another or/and be located in one plane.

A compact configuration of the mixer can be supported by a housing central plane of the duct housing, which central plane contains a release duct central axis of the at least one release duct, being essentially parallel to the incoming flow surface.

At least one and preferably a plurality of plate-shaped reactant-receiving elements extending into the reactant-receiving duct may be provided in the exhaust gas collection duct. The reactant injected into the reactant release duct in the form of droplets can impinge on this reactant-receiving element or on these reactant-releasing elements. Since hot exhaust gas flows around the surfaces of the reactant-receiving elements, the reactant reaching these evaporates and is directly carried along by exhaust gas flowing around through the reactant-receiving ducts and is mixed with this exhaust gas.

To provide in the process a large surface that can be wetted with reactant, it is proposed that a plurality of reactant-receiving elements arranged following one another in the direction away from the reactant-receiving opening be provided in the exhaust gas collection duct, and that the depth of meshing of the reactant-receiving elements with the reactant-receiving duct increase in the direction away from the reactant-receiving opening to a reactant-receiving element with a maximum depth of meshing.

Provisions may be made for a configuration that can be manufactured in a simple manner but is nevertheless thermally stable for the exhaust gas collection body to be provided as a shaped sheet metal part, or/and for the duct housing to be provided with at least two and preferably three shaped sheet metal parts, or/and for a collection duct circumferential wall delimiting the exhaust gas collection duct to be provided with at least one shaped sheet metal part.

The present invention further pertains to an exhaust system for an internal combustion engine, comprising an exhaust gas-carrying duct, a mixer, which is configured according to the present invention and is arranged in the exhaust gas-carrying duct, and a reactant release device for releasing reactant into the reactant-receiving duct of the mixer.

To make it possible to use essentially the total amount of exhaust gas flowing through the exhaust gas duct for mixing with reactant, it is proposed that the exhaust gas collection body be arranged with its incoming flow surface essentially at right angles to an exhaust gas main flow direction in the exhaust gas duct, or/and for the exhaust gas collection body to cover the exhaust gas duct essentially fully in a housing accommodating the mixer at right angles to the exhaust gas main flow direction.

An oxidation catalytic converter device, preferably a diesel oxidation catalytic converter device, may be provided in the exhaust system upstream of the mixer for the exhaust gas treatment. Further, an SCR catalytic converter device or/and a particle filter device may be provided downstream of the mixer.

The present invention will be described below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
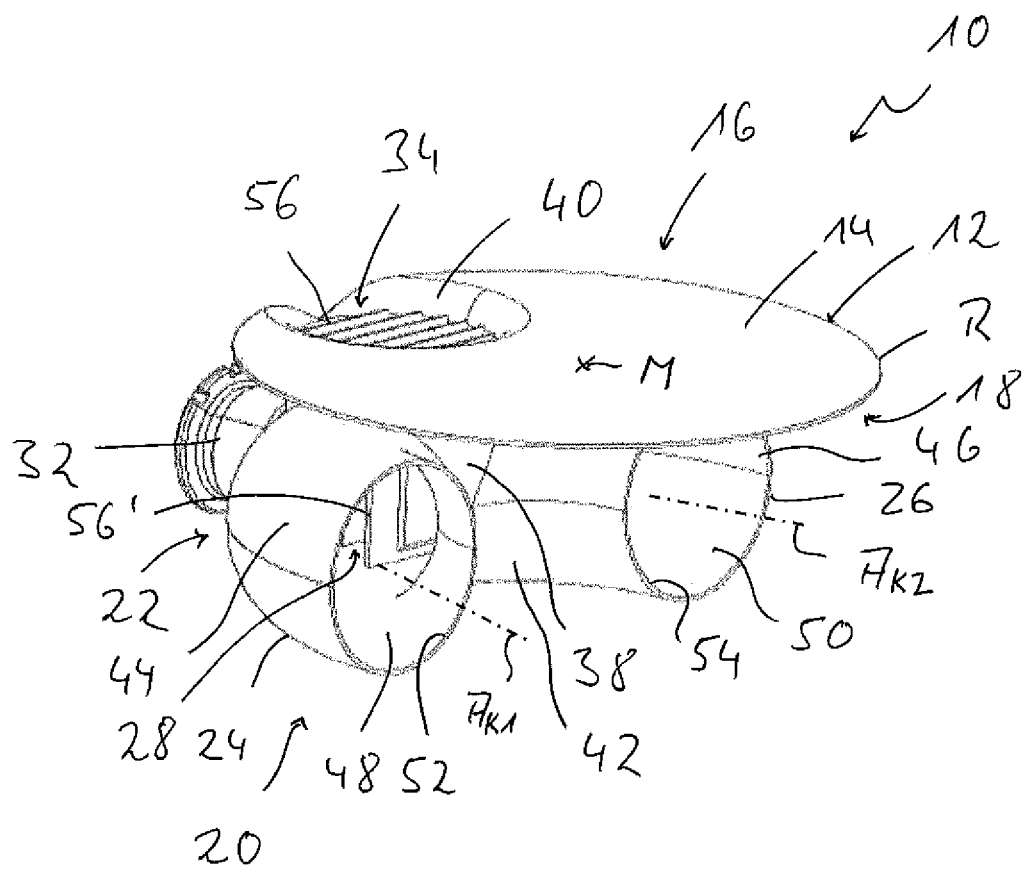
FIG. 1 is a perspective view showing a mixer.

Referring to the drawings, a mixer for an exhaust system of an internal combustion engine is generally designated by 10 in FIG. 1. The mixer comprises an exhaust gas collection body 12 configured in essential areas as an essentially flat, i.e., uncurved plate. The exhaust gas collection body 12 has an incoming flow surface 14, which is shown as being oriented upward in FIG. 1, on an incoming flow side 16 and has a rear side 18 oriented downward in FIG. 1.

A duct housing generally designated by 20 is arranged on the rear side 18 of the exhaust gas collection body 12. The duct housing 20 has an arc-segment-shape or U-shape with a housing apex area 22 corresponding to a connection web of a U-shape and with housing duct areas 24, 26, which adjoin the housing apex area 22 or extend this. A reactant-receiving duct 28 is provided in the housing apex area 22. Reactant, for example, a urea/water solution, is injected into the reactant-receiving duct 28 provided in the housing apex area 22 by means of a reactant release device 30, which can be seen in FIGS. 2 and 3 and is generally also called an injector. The reactant is injected into the reactant-receiving duct 28 in the form of a spray cone S shown in FIG. 3 with a reactant main flow direction $H_R$.

To connect the reactant release device 30 to the duct housing 20, a reactant release pipe 32 is provided at the duct housing 20 in the area of a reactant-receiving opening 33 formed therein. At its end located at a spaced location from the duct housing 20, the reactant release pipe 32 can receive the reactant release device 30.

Offset from the center M of the plate to a disk edge R, an exhaust gas collection opening 34 is formed in the exhaust gas collection body 12. The exhaust gas collection opening 34 is adjoined by an exhaust gas collection duct 36, which is open in the housing apex area 22 to the reactant-receiving duct 28. The exhaust gas collection duct 36 is delimited by a collection duct circumferential wall 38, which passes over (has a transition) in its area located close to the exhaust gas collection body 12 in a rounded transition area 40 into the essentially flat exhaust gas collection body 12.

The exhaust gas collection body 12 may be provided as a shaped sheet metal part, for example, integrally with the rounded transition area 40. The rounded transition area may be provided in a shaping operation as a flanged hole. The collection duct circumferential wall 38 provided with an essentially cylindrical contour may be positioned such that it adjoins the end of the rounded transition area, which end projects from the plane of the exhaust gas collection body 12 or of the incoming flow surface 14 thereof, and the collection duct circumferential wall 38 may be permanently connected thereto end by a preferably circumferential weld seam. A collection duct central axis $A_S$ is preferably at right angles to a plane $E_A$, which is defined by the incoming flow surface 14 and is at right angles to the drawing plane of FIG. 3.

At its end adjoining the duct housing 20, the collection duct circumferential wall 38 is adapted to the circumferential contour of the duct housing 20, which circumferential contour has, for example, an approximately circular cross section, and is permanently connected to the duct housing 20, for example, by welding. The collection duct circumferential wall 38 may be formed by shaping a flat sheet metal blank into a tubular shape, or it may be formed by correspondingly cutting off a piece of pipe.

The duct housing 20 may be composed from a plurality of shaped sheet metal parts. A lower housing part 42 located facing away from the exhaust gas collection body 12 may be shaped from a sheet metal blank as a half shell essentially such that it provides one part of the housing apex area 20, on the one hand, and respective parts of the housing duct areas 24, 26, on the other hand. The part of the duct housing 20 that faces the exhaust gas collection body 12 may be provided, for example, with two upper housing parts 44, 46, which can be connected to the lower housing part 42, for example, by welding to form the two housing duct areas 24, 26, and which leave between them a space for receiving the collection duct circumferential wall 38 and may also be connected to this circumferential wall 38 permanently by welding. As an alternative, the duct housing 20 could be provided by a bent pipe section or a single shaped sheet metal part bent into a tubular, bent structure.

Figure 3:
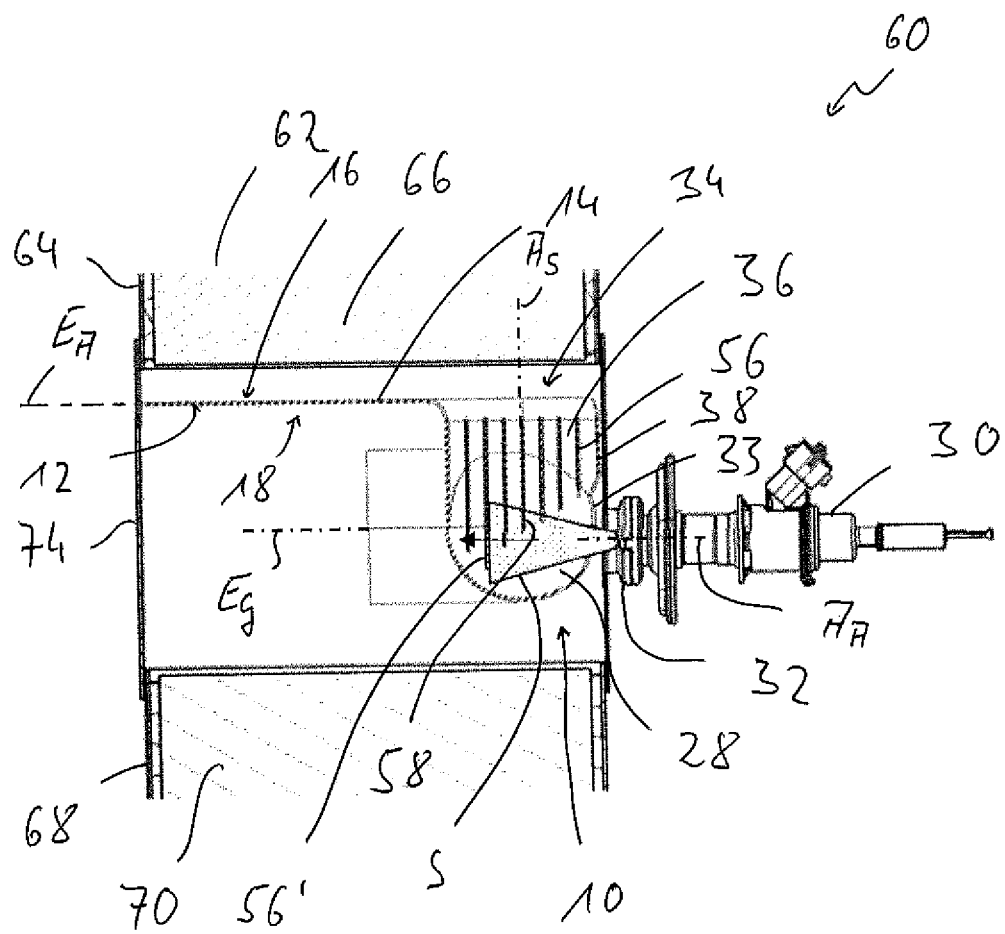
FIG. 3 is a longitudinal sectional view of an exhaust system containing the mixer according to FIG. 1.

The reactant release pipe 32 may also be fixed to the housing apex area 22 in the area of the reactant-receiving opening 33 by welding, so that, for example, the collection duct central axis $A_S$ and a release pipe central axis AA are located in a plane corresponding to the drawing plane of FIG. 3 and are arranged approximately at right angles, i.e., at an angle of approximately 90°, to one another. As this is suggested in FIG. 3, this angle may also be somewhat greater than 90°, so that the reactant main flow direction $H_R$ has a flow direction component oriented opposite an exhaust gas flow direction in the exhaust gas collection duct 36 in the view shown in FIG. 3. Further, the arrangement is preferably such that the collection duct central axis $A_S$ is at right angles to a housing central plane $E_G$, which may be defined, for example, by release duct central axes $A_{K1}$ and $A_{K2}$ (shown in FIG. 1) of release ducts 48, 50, which are provided in the two housing duct areas 24, 26, respectively, and adjoin the reactant-receiving duct 28. Each of these release ducts 48, 50 is open in its end located at a distance from the reactant-receiving duct 28 via a respective release opening 52, 54 for releasing a mixture of exhaust gas and reactant.

A plurality of plate-shaped reactant-receiving elements 56, which are arranged essentially parallel to the collection duct central axis $A_S$ and to one another, are arranged in the exhaust gas collection duct 36. These reactant-receiving elements 56 may be fixed, for example, at the collection duct circumferential wall 38 by welding and have reactant-receiving surfaces 58 oriented facing the reactant-receiving opening 33 in the duct housing 20 and facing the reactant release pipe 32. The reactant-receiving elements 56 mesh with the reactant-receiving duct 28 in the housing apex area 22 of the duct housing 20, wherein the depth of meshing of the reactant-receiving elements 56 following each other in the direction away from the reactant-receiving opening 33 increases up to a reactant-receiving element 56' having maximum depth of meshing. Thus, up to the reactant-receiving element 56' having maximum depth of meshing, each reactant-receiving element 56 provides an area of the respective reactant-receiving surface 58 that is not covered in the direction of the reactant released device 30 by another reactant-receiving element 56. The reactant released by the reactant release device 30 in the reactant main flow direction $H_R$ onto the reactant-receiving elements 56 wets the surface of these reactant-receiving elements 56. Since the reactant-receiving elements 56, around which exhaust gas flows, are heated by the hot exhaust gas, the reactant or at least an essential part of the reactant evaporates on the reactant-receiving surfaces 58 and is thus carried along by the exhaust gas flowing around these reactant-receiving surfaces 58 into the reactant-receiving duct 28 and via this into the two release ducts 48, 50. The mixing of exhaust gas and reactant is also supported now by the flow deflection of the exhaust gas flowing through the exhaust gas collection duct 36, which flow deflection takes place especially in the area of the reactant-receiving duct 28, and by the swirling occurring in the process.

Figure 2:
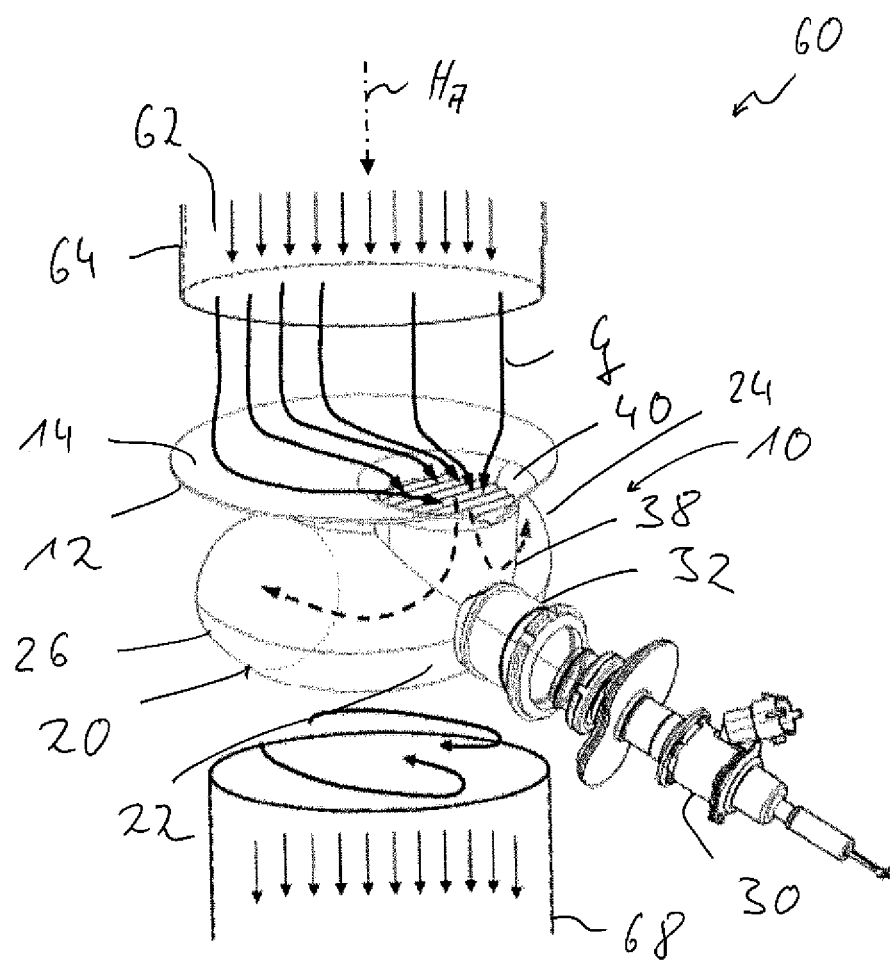
FIG. 2 is a perspective view showing the mixer according to FIG. 1 in conjunction with additional components of an exhaust system.

FIGS. 2 and 3 illustrate the integration of the mixer 10 into an exhaust system generally designated by 60. An exhaust gas duct 62 of the exhaust system 60 may be provided here, for example, in an exhaust gas pipe 64, which is arranged upstream of the mixer 10 and in which, for example, a diesel oxidation catalytic converter device 66 may also be provided, and in an exhaust gas pipe 68, which is arranged downstream of the mixer 10 and in which an SCR catalytic converter device 70, which also receives the mixture of reactant and exhaust gas, and possibly also a particle filter device may be arranged as well. As an alternative or in addition, such a particle filter device could also be arranged upstream in relation to the mixer 10.

The exhaust gas duct 62 is provided in the area located between the two exhaust gas pipes 64, 68 by a tubular housing 74 carrying the mixer 10. For example, the mixer 10 may be fixed at the housing 74 by means of the reactant release pipe 32 passing through the housing 74 and be positioned in the housing 74 such that the incoming flow surface 14 of the exhaust gas collection body 12 is essentially at right angles to an exhaust gas main flow direction HA, especially upstream of the mixer 10 and it essentially fully covers the inner cross-sectional area of the housing 74. The disk edge R of the exhaust gas collection body 12 may adjoin for this purpose an inner circumferential surface of the housing 74 or be positioned at a short distance thereto.

As this is illustrated in FIG. 2, the exhaust gas G flowing through the exhaust gas pipe 64 is deflected at the incoming flow surface 14 of the exhaust gas collection body 12 in the direction of the exhaust gas collection opening 34, it flows through the exhaust gas collection duct 36 and is additionally deflected in the reactant-receiving duct 28 in the direction of the release ducts 48, 50. The mixture of exhaust gas and reactant, which is generated in the course of this flow through the duct housing 20, leaves the release ducts 48, 50 via the openings 52, 54 thereof and flows in the process in the direction of the inner surface of the housing 74 carrying the mixer 10, it is also deflected there once more and it then flows into the exhaust gas pipe 68 positioned downstream of the mixer 10 and into the SCR catalytic converter device 70 provided therein.

With a simple configuration, efficient mixing of exhaust gas and reactant is achieved with the mixer shown in FIGS. 1 through 3. Since the exhaust gas collection body 12 has, on the one hand, an outer circumferential geometry adapted to the inner cross-sectional geometry of the housing 74 accommodating the mixer 10 and the duct housing 20, which is arranged on the rear side 18 of the exhaust gas collection body 12 and at a spaced location thereto, is adapted with its arc-like shape to the inner circumferential contour of the housing 74 and it does not project outwards over the disk edge R of the exhaust gas collection body 12 at any circumferential area, the possibility of good fitting into the essentially tubular or cylindrical housing 74 is achieved with a compact configuration.

Figure 4:
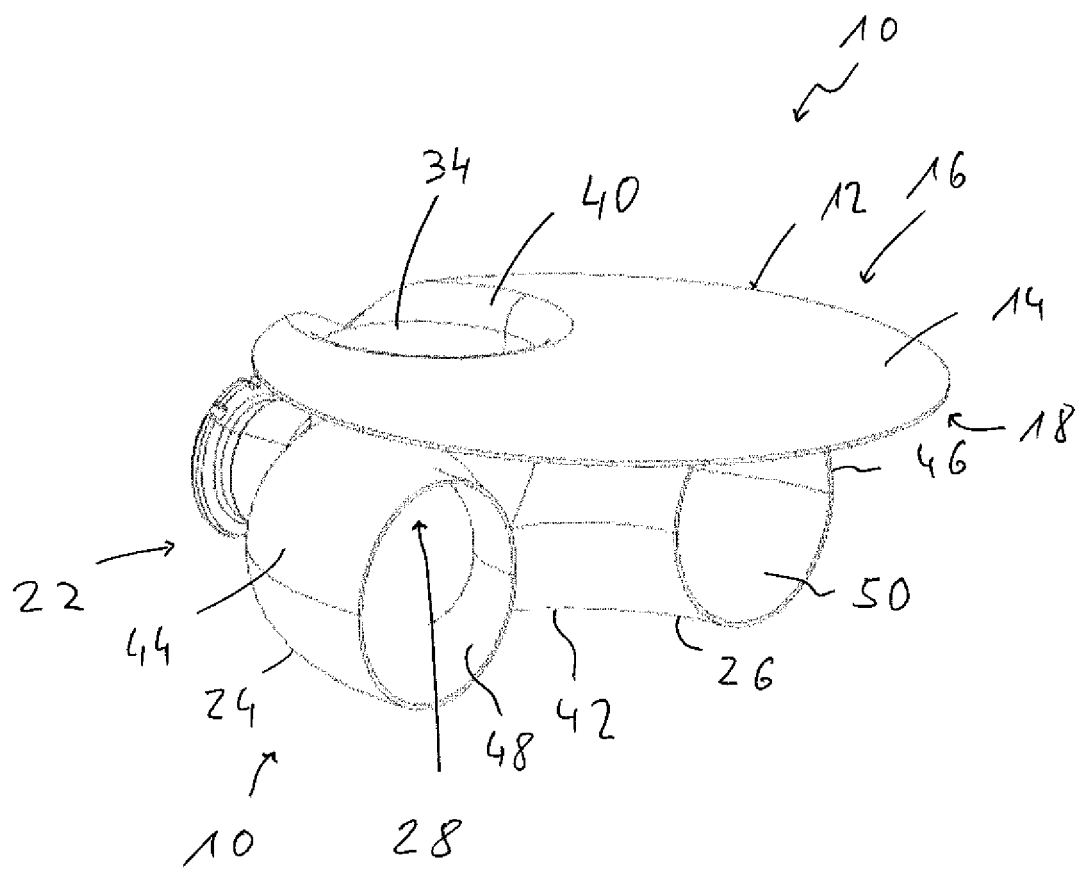
FIG. 4 is a perspective view showing an alternative embodiment of a mixer.
Figure 5:
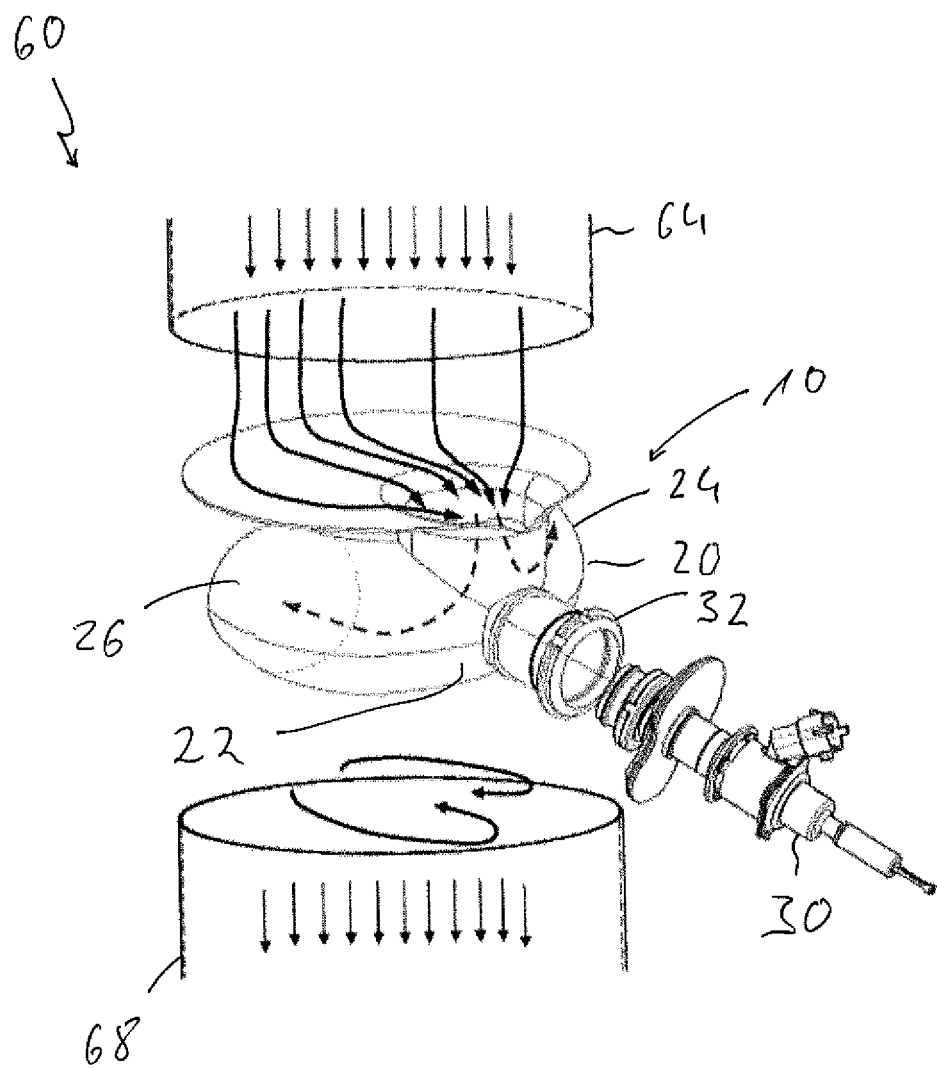
FIG. 5 is a perspective view showing the mixer according to FIG. 4 in conjunction with additional components of an exhaust system.

An alternative embodiment of the mixer 10 is shown in FIGS. 4 and 5. The mixer 10 and the exhaust system 60 having same have basically the configuration described above with reference to FIGS. 1 through 3, so that reference can be made to the related explanations. It can, however, be seen that no plate-shaped reactant-receiving elements are provided in the exhaust gas collection duct 36 in the mixer 10 shown in FIGS. 4 and 5. The exhaust gas G guided from the incoming flow surface 14 to the exhaust gas collection opening 34 flows through the exhaust gas collection duct 36 into the reactant-receiving duct 28, is mixed with reactant there and in the then following release ducts 48, 50, and it leaves the release ducts via the openings 52, 54 thereof.

The focus is in this embodiment on the possibility of an essentially free flow through the exhaust gas collection duct and on the mixing of exhaust gas and reactant, which is generated primarily by flow deflection and swirling.

It is apparent that variations can be made in the above-described configurations of a mixer without deviating from the configuration concept of the present invention. For example, one or more openings, which allow the passage of exhaust gas or of the mixture of exhaust gas and reactant formed in the duct housing, may thus be provided in the exhaust gas collection body or/and in the duct housing. The number of reactant-receiving elements provided in the embodiment according to FIGS. 1 through 3 may also be different from that shown. It would also be possible, for example, to provide fewer reactant-receiving elements or only a single reactant-receiving element. The reactant release body could also be configured, for example, with a concave shape or with a correspondingly concavely shaped incoming flow surface, so that an even more efficient deflection would take place in the direction of the exhaust gas collection opening. It may be advantageous or necessary on the basis of the shaping operation especially in case of the configuration of the exhaust gas collection body with the rounded transition area as a shaped sheet metal part to provide a recess, which can be seen in the figures, in the incoming flow surface oriented in the upstream direction in the area in which the exhaust gas collection opening has the shortest distance to the disk edge in order to provide the rounded transition area. This is the case above all when the exhaust gas collection opening is to be provided very close to the disk edge. As an alternative, the incoming flow surface enclosing the exhaust gas collection opening or the rounded transition area could be configured as a completely flat surface in this area as well in case the exhaust gas collection opening is located at a somewhat greater distance away from the disk edge. The release ducts may also be configured with a different cross-sectional geometry, for example, with an oval or flattened round geometry.

While specific embodiments of the invention have been shown and described in detail to illustrate the application of the principles of the invention, it will be understood that the invention may be embodied otherwise without departing from such principles.

What is claimed is:

1. A mixer for mixing exhaust gas flowing in an exhaust gas duct of an internal combustion engine with reactant injected into the exhaust gas duct, the mixer comprising:
   a plate-shaped exhaust gas collection body with an incoming flow surface on an exhaust gas incoming flow side and with a rear side facing away from the incoming flow side;
   an exhaust gas collection duct; and
   a duct housing arranged on the rear side of the exhaust gas collection body, the duct housing comprising a reactant-receiving duct and a release duct leading away from the reactant-receiving duct, wherein an exhaust gas collection opening is formed in the exhaust gas collection body and the exhaust gas collection duct leads from the exhaust gas collection opening to the duct housing and the exhaust gas collection duct is open to the reactant-receiving duct.

2. A mixer in accordance with claim 1, wherein:
   the exhaust gas collection body has a round outer circumferential contour; or
   the exhaust gas collection opening is arranged offset in relation to a plate center of the exhaust gas collection body; or
   the duct housing is arranged at a spaced location from a rear side of the exhaust gas collection body; or
   any combination of the exhaust gas collection body has a round outer circumferential contour and the exhaust gas collection opening is arranged offset in relation to a plate center of the exhaust gas collection body and the duct housing is arranged at a spaced location from a rear side of the exhaust gas collection body.

3. A mixer in accordance with claim 1, wherein the exhaust gas collection duct has a collection duct circumferential wall that passes over into the plate-shaped exhaust gas collection body in a rounded transition area, wherein the exhaust gas collection opening defines at least a portion of a fluid flow path extending through the plate-shaped exhaust gas collection body for passing fluid from the incoming flow side to the duct housing.

4. A mixer in accordance with claim 3, wherein at least one part of the transition area is made in one piece with the exhaust gas collection body.

5. A mixer in accordance with claim 3, wherein at least one part of the transition area is made in one piece with the collection duct circumferential wall.

6. A mixer in accordance with claim 1, wherein a collection duct central axis of the exhaust gas collection duct is essentially at right angles to the incoming flow surface.

7. A mixer in accordance with claim 1, wherein:
   the duct housing further comprises another release duct;

the duct housing has a U-shape or an arc segment shape with a housing apex area providing the reactant-receiving duct and two housing duct areas, which adjoin the housing apex area and each provide one of the release ducts; and the exhaust gas collection duct is open in the housing apex area to the reactant-receiving duct.

8. A mixer in accordance with claim 7, further comprising a reactant release pipe open to the reactant-receiving duct in the area of a reactant-receiving opening of the duct housing, the reactant release pipe being arranged in the housing apex area at the duct housing.

9. A mixer in accordance with claim 8, wherein:
a release pipe central axis of the reactant release pipe and a collection duct central axis of the exhaust gas collection duct are essentially at right angles to one another; or
a release pipe central axis of the reactant release pipe and a collection duct central axis of the exhaust gas collection duct are located in one plane; or
a release pipe central axis of the reactant release pipe and a collection duct central axis of the exhaust gas collection duct are essentially at right angles to one another and are located in one plane.

10. A mixer in accordance with claim 8, further comprising a plurality of shaped reactant-receiving elements provided in the exhaust gas collection duct and extending into the reactant-receiving duct, wherein the plurality of reactant-receiving elements are arranged following one another in a direction away from the reactant-receiving opening and a depth of meshing of the reactant-receiving elements with the reactant-receiving duct increases in the direction away from the reactant-receiving opening up to a reactant-receiving element with a maximum depth of meshing.

11. A mixer in accordance with claim 1, wherein a housing central plane of the duct housing, which housing central plane contains a release duct central axis of the release duct is essentially parallel to the incoming flow surface.

12. A mixer in accordance with claim 1, further comprising a shaped reactant-receiving element provided in the exhaust gas collection duct and extending into the reactant-receiving duct.

13. A mixer in accordance with claim 1, wherein:
the exhaust gas collection body is configured as a shaped sheet metal part;
the duct housing is configured with at least two shaped sheet metal parts;
a collection duct circumferential wall delimiting the exhaust gas collection duct is configured with at least one shaped sheet metal part; or
any combination of the exhaust gas collection body is configured as a shaped sheet metal part and the duct housing is configured with at least two shaped sheet metal parts and a collection duct circumferential wall delimiting the exhaust gas collection duct is configured with at least one shaped sheet metal part.

14. An exhaust system for an internal combustion engine, the exhaust system comprising:
an exhaust gas duct;
a reactant release device; and
a mixer arranged in the exhaust gas duct, the mixer comprising:
a plate-shaped exhaust gas collection body with an incoming flow surface on an exhaust gas incoming flow side and with a rear side facing away from the incoming flow side;
an exhaust gas collection duct; and
a duct housing arranged on the rear side of the exhaust gas collection body, the duct housing comprising a reactant-receiving duct and a release duct leading away from the reactant-receiving duct, wherein an exhaust gas collection opening is formed in the exhaust gas collection body and the exhaust gas collection duct leads from the exhaust gas collection opening to the duct housing and the exhaust gas collection duct is open to the reactant-receiving duct and the mixer is connected to the reactant release device for releasing reactant into the reactant-receiving duct of the mixer.

15. An exhaust system in accordance with claim 14, wherein:
the exhaust gas collection body is arranged with the incoming flow surface essentially at right angles to an exhaust gas main flow direction in the exhaust gas duct; or
the exhaust gas collection body covers the exhaust gas duct essentially fully in a housing accommodating the mixer at right angles to the exhaust gas main flow direction; or
the exhaust gas collection body is arranged with the incoming flow surface essentially at right angles to an exhaust gas main flow direction in the exhaust gas duct and the exhaust gas collection body covers the exhaust gas duct essentially fully in a housing accommodating the mixer at right angles to the exhaust gas main flow direction.

16. An exhaust system in accordance with claim 14, further comprising:
an oxidation catalytic converter device provided upstream of the mixer; or
an SCR catalytic converter device is provided downstream of the mixer; or
a particle filter device is provided downstream of the mixer; or
any combination of an oxidation catalytic converter device provided upstream of the mixer and an SCR catalytic converter device is provided downstream of the mixer and a particle filter device is provided downstream of the mixer.

17. An exhaust system in accordance with claim 14, wherein:
the exhaust gas collection duct has a collection duct circumferential wall that passes over into the plate-shaped exhaust gas collection body in a rounded transition area;
at least one part of the transition area is made in one piece with the exhaust gas collection body; and
at least one part of the transition area is made in one piece with the collection duct circumferential wall.

18. An exhaust system in accordance with claim 14, wherein a collection duct central axis of the exhaust gas collection duct is essentially at right angles to the incoming flow surface, wherein the exhaust gas collection opening defines at least a portion of a fluid flow path extending through the plate-shaped exhaust gas collection body for passing fluid from the incoming flow side to the duct housing.

19. An exhaust system in accordance with claim 14, wherein:
the duct housing further comprising another release duct;
the duct housing has a U-shape or an arc segment shape with a housing apex area providing the reactant-receiving duct and two housing duct areas, which adjoin the housing apex area and each provide one of the release ducts; and the exhaust gas collection duct is open in the housing apex area to the reactant-receiving duct.

20. An exhaust system in accordance with claim 19, further comprising a reactant release pipe open to the reactant-receiving duct in the area of a reactant-receiving opening of the duct housing, the reactant release pipe being arranged in the housing apex area at the duct housing.

* * * * *